UNITED STATES PATENT OFFICE.

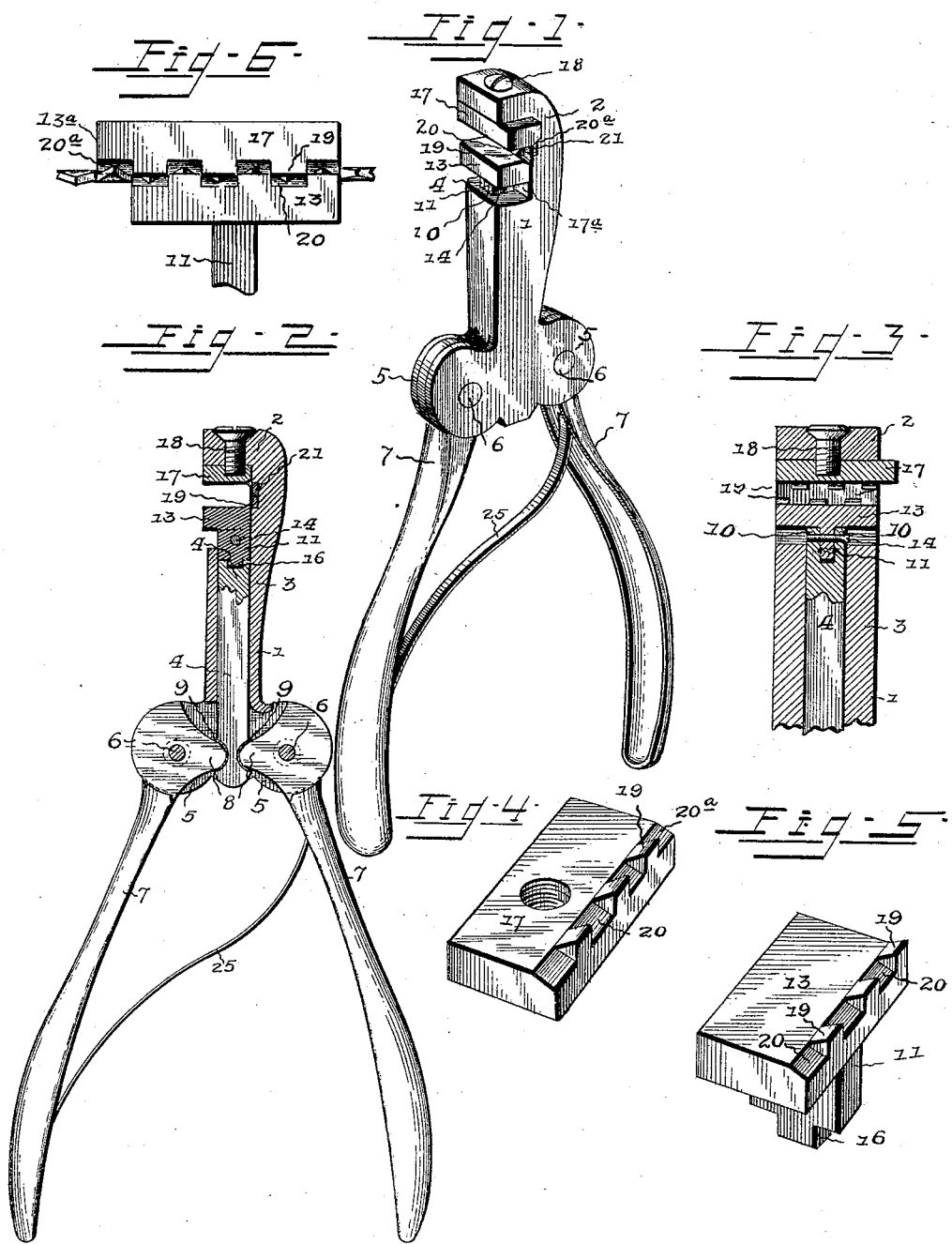

WILLIAM LITTLEY, OF PHILADELPHIA, PENNSYLVANIA.

SAW-SET.

SPECIFICATION forming part of Letters Patent No. 616,194, dated December 20, 1898.

Application filed March 31, 1898. Serial No. 675,956. (No model.)

*To all whom it may concern:*

Be it known that I, WILLIAM LITTLEY, a citizen of the United States, residing at Philadelphia, in the county of Philadelphia and State of Pennsylvania, have invented a new and useful Saw-Set, of which the following is a specification.

The invention relates to improvements in saw-sets.

The object of the present invention is to improve the construction of saw-sets and to provide a simple, inexpensive, and efficient device adapted to be operated with one hand and capable of setting a series of teeth alternately in opposite directions at each operation of the device.

A further object of the invention is to provide a device which will not dull or otherwise injure the points of the teeth of a saw while setting them and in which the saw-setting dies may be readily removed and changed to enable the device to be quickly arranged for setting the teeth of a saw.

The invention consists in the construction and novel combination and arrangement of parts, as hereinafter fully described, illustrated in the accompanying drawings, and pointed out in the claims hereto appended.

In the drawings, Figure 1 is a perspective view of a saw-set constructed in accordance with this invention. Fig. 2 is a longitudinal sectional view of the same. Fig. 3 is a detail sectional view taken longitudinally of the shank or body and at right angles to Fig. 2. Figs. 4 and 5 are detail perspective views of the saw-setting dies. Fig. 6 is a detail view of the dies, illustrating their arrangement relative to the teeth of a saw-blade.

Like numerals of reference designate corresponding parts in all the figures of the drawings.

1 designates a shank or body having an arm 2 at its outer end and provided at its inner portion with a longitudinal opening or bore, forming a casing or housing 3 for a reciprocating plunger 4, which is guided by the inner hollow portion of the shank or body. The inner end of the shank or body is provided at opposite sides with perforated ears 5, arranged in pairs and receiving pivots 6 of a pair of handles 7, which are provided at their pivoted ends with inwardly-extending eccentrically-arranged projections or teeth 8, which mesh with corresponding recesses 9 of the inner end of the plunger, whereby the handles when compressed and separated reciprocate the plunger.

The outer end 10 of the plunger is bifurcated and receives a shank 11 of a removable saw-setting die 13, which is detachably secured to the plunger by means of a screw 14, passing through perforations of the bifurcated end of the plunger and the shank 11. The shank 11 of the die is provided with a projection or tailpiece 16, which fits in a recess at the inner end of the bifurcation to prevent the die-plate from turning on the screw.

The die-plate 13, which coöperates with a corresponding die-plate 17, is arranged in a space or recess formed by the arm 2 of the shank or body 1, and the outer end of the tubular portion 4 and the said die-plate 13, which is oblong, has one of its longitudinal edges arranged against the flat portion $17^a$ of the shank between the arm and the inner hollow portion 4. The flat portion $17^a$ of the shank guides the movable die 13 and serves to support the stationary die 17, which is detachably secured to the arm 2 by a screw 18, passing through registering perforations of the arm and the die 17 and engaging a threaded portion of the latter.

The dies 13 and 17 are provided at their inner longitudinal edges with beveled lugs 19, projecting beyond the inner faces of the dies and adapted to engage the teeth of a saw, the lugs of one die being located opposite the intervals between the lugs of the other die, whereby a series of teeth of a saw will be alternately set in opposite directions at each operation of the device. The spaces or recesses between the projecting lugs are beveled, as shown at 20, to receive the set teeth, and the body portion of the saw adjacent to the teeth operated on is firmly clamped between the dies, whereby the blade of a saw is effectually prevented from buckling. The dies may be provided with any desired number of saw-setting lugs, which may vary in size and pitch to correspond with the character of teeth to be set, and by mounting the dies detachably they may be readily removed to enable other dies to be mounted in the device to adapt the latter for operating on any kind of saw.

The flat inner face of the shank is provided with a plate 21 of soft metal arranged in a recess of the shank flush with the adjacent face thereof and adapted to abut against the teeth of the saw operated on to prevent the device from dulling or otherwise injuring the points of said teeth. The plate 21 is preferably constructed of copper, which is too soft to injure the teeth of a saw.

In order to enable the device to be properly positioned on a saw-blade so that the setting-lugs will lie opposite the teeth, the outer die is extended laterally, and this lateral extension 13ª is provided with a recess 20ª, arranged to receive and fit the last tooth previously set. By this construction the saw-setting device may be rapidly moved along a saw-blade, the last tooth of each series of teeth set forming a guide for positioning the device properly with relation to the adjacent teeth to be operated on.

The handles are preferably curved in cross-section to present outer convex faces and inner concave faces, and they are maintained normally separated by a spring 25, secured at one end to one of the handles and having its other end free and engaging the inner face of the other handle, the concave faces of the handle serving to receive and partially house the spring.

The invention has the following advantages: The device, which is simple and comparatively inexpensive in construction, is adapted to be operated with one hand, and it is capable of simultaneously setting a series of teeth and bending them alternately in opposite directions to the desired degree. The soft-metal plate prevents the points of the teeth from being dulled or otherwise injured, and the inner flat faces of the dies support the blade of a saw and prevent it from buckling under the setting operation. The lateral extension of the inner die and its recess forms a simple and efficient guide, which will enable the device to be operated rapidly on a saw-blade without losing any time in positioning the setting-lugs with relation to the teeth to be set.

Changes in the form, proportion, and minor details of construction may be resorted to without departing from the spirit or sacrificing any of the advantages of this invention.

What I claim is—

1. In a device of the class described, the combination of a shank or body provided at its outer end with an arm and having an inner hollow portion or casing, said shank or body being provided at its inner end with oppositely-disposed perforated ears arranged in pairs, a plunger mounted in the hollow portion or casing, handles pivoted between the perforated ears and arranged to actuate the plunger, and a pair of dies detachably secured to the arm of the shank or body and to the plunger and provided with offsetting lugs, and a guide or gage arranged at one side of the shank or body, substantially as described.

2. In a device of the class described, the combination of a shank or body provided with an inner hollow portion, a stationary die detachably secured to the outer portion of the shank or body, a plunger arranged in the hollow portion of the same and having its outer end bifurcated and provided with a recess, a movable die having a shank fitting in the bifurcation and provided with a projection or tailpiece to engage the recess, a fastening device passing through the plunger and the shank of the movable die, and means for operating the plunger, substantially as described.

3. A device of the class described provided at one side with a guide, consisting of a projecting portion provided with a recess and adapted to receive a set tooth, substantially as and for the purpose described.

4. In a device of the class described, the combination of a shank or body provided with an inner hollow portion and having at its outer end an arm provided with a perforation, a stationary die fitting against the shank and arranged at the inner face of said arm, a fastening device passing through the perforation of the arm and detachably securing the stationary die to the same, a plunger arranged in the hollow portion of the shank or body and having its outer end bifurcated and provided with a recess, a movable die having a shank fitting in the bifurcation and provided with a projection or tailpiece to engage the recess, a fastening device passing through the plunger and the shank of the movable die, and means for operating the plunger, substantially as described.

5. In a device of the class described, the combination of the dies provided with setting-lugs for engaging the teeth of a saw-blade, one of the dies being extended beyond the other and provided with a recess, adapted to receive a set tooth and form a guide, and means for operating the dies, substantially as described.

In testimony that I claim the foregoing as my own I have hereto affixed my signature in the presence of two witnesses.

WILLIAM LITTLEY.

Witnesses:
JOHN H. SIGGERS,
ROBT. E. CRUMP.